United States Patent
Dreissig et al.

(10) Patent No.: US 8,405,956 B2
(45) Date of Patent: Mar. 26, 2013

(54) HIGH VOLTAGE ELECTROLYTIC CAPACITORS

(75) Inventors: Dirk H. Dreissig, Myrtle Beach, SC (US); John Galvagni, Hendersonville, NC (US)

(73) Assignee: AVX Corporation, Myrtle Beach, SC (US)

( * ) Notice: Subject to any disclaimer, the term of this patent is extended or adjusted under 35 U.S.C. 154(b) by 458 days.

(21) Appl. No.: 12/475,743

(22) Filed: Jun. 1, 2009

(65) Prior Publication Data

US 2010/0302709 A1   Dec. 2, 2010

(51) Int. Cl.
*H01G 9/00* (2006.01)
(52) U.S. Cl. .................... 361/503; 361/532
(58) Field of Classification Search .................. 361/503, 361/504–505, 532
See application file for complete search history.

(56) References Cited

U.S. PATENT DOCUMENTS

| | | | |
|---|---|---|---|
| 3,345,545 A | 10/1967 | Bourgault et al. |
| 4,582,574 A | 4/1986 | Nguyen et al. |
| 4,910,645 A | 3/1990 | Jonas et al. |
| 4,992,910 A | 2/1991 | Evans |
| 5,098,485 A | 3/1992 | Evans |
| 5,136,474 A | 8/1992 | Sarangapani et al. |
| 5,236,627 A | 8/1993 | Hannecart et al. |
| 5,284,723 A | 2/1994 | Hannecart et al. |
| 5,338,472 A | 8/1994 | Yokoyama et al. |
| 5,369,547 A | 11/1994 | Evans |
| 5,400,211 A | 3/1995 | Evans |
| 5,435,874 A | 7/1995 | Takeuchi et al. |
| 5,457,862 A | 10/1995 | Sakata et al. |
| 5,469,325 A | 11/1995 | Evans |
| 5,473,503 A | 12/1995 | Sakata et al. |
| 5,507,966 A | 4/1996 | Liu |
| 5,543,249 A | 8/1996 | Takeuchi et al. |
| 5,559,667 A | 9/1996 | Evans |
| 5,571,640 A | 11/1996 | Takeuchi et al. |
| 5,726,118 A | 3/1998 | Ivey et al. |
| 5,729,428 A | 3/1998 | Sakata et al. |
| 5,737,181 A | 4/1998 | Evans |
| 5,754,394 A | 5/1998 | Evans et al. |

(Continued)

FOREIGN PATENT DOCUMENTS

EP   0989572 A2   3/2000
EP   0989572 A3   3/2000

(Continued)

OTHER PUBLICATIONS

Conducting Polymers as Active Materials in Electrochemical Capacitors, Rudge et al, Journal of Power Sources, vol. 47, 1994, pp. 89-107 (38 pages).

(Continued)

*Primary Examiner* — Eric Thomas
(74) *Attorney, Agent, or Firm* — Dority & Manning, P.A.

(57) ABSTRACT

A wet electrolytic capacitor that includes a porous anode body that contains a dielectric layer formed by anodic oxidation; a cathode that includes a metal substrate coated with a conductive polymer; and an aqueous electrolyte disposed in contact with the cathode and the anode is provided. The electrolyte includes a salt of a weak organic acid and water. The electrolyte has a pH of from about 5.0 to about 8.0 and an ionic conductivity of from about 0.5 to about 80 milliSiemens per centimeter or more, determined at a temperature of 25° C.

26 Claims, 1 Drawing Sheet

U.S. PATENT DOCUMENTS

| | | | |
|---|---|---|---|
| 5,776,628 A | 7/1998 | Kraft et al. | |
| 5,786,980 A | 7/1998 | Evans | |
| 5,812,367 A | 9/1998 | Kudoh et al. | |
| 5,858,911 A | 1/1999 | Wellen et al. | |
| 5,894,403 A | 4/1999 | Shah et al. | |
| 5,920,455 A | 7/1999 | Shah et al. | |
| 5,926,362 A | 7/1999 | Muffoletto et al. | |
| 5,949,639 A | 9/1999 | Maeda et al. | |
| 5,973,913 A | 10/1999 | McEwen et al. | |
| 5,982,609 A | 11/1999 | Evans | |
| 6,037,077 A | 3/2000 | Nowaczyk | |
| 6,096,391 A | 8/2000 | Muffoletto et al. | |
| 6,110,622 A | 8/2000 | Frysz et al. | |
| 6,157,531 A | 12/2000 | Breyen et al. | |
| 6,184,160 B1 | 2/2001 | Yan et al. | |
| 6,191,936 B1 | 2/2001 | Webber et al. | |
| 6,197,252 B1 | 3/2001 | Bishop et al. | |
| 6,208,502 B1 | 3/2001 | Hudis et al. | |
| 6,219,222 B1 | 4/2001 | Shah et al. | |
| 6,224,985 B1 | 5/2001 | Shah et al. | |
| 6,275,373 B1 | 8/2001 | Marshall et al. | |
| 6,287,630 B1 | 9/2001 | Strange et al. | |
| 6,307,732 B1 * | 10/2001 | Tsubaki et al. | 361/509 |
| 6,322,912 B1 | 11/2001 | Fife | |
| 6,332,900 B1 | 12/2001 | Muffoletto et al. | |
| 6,391,275 B1 | 5/2002 | Fife | |
| 6,404,619 B1 | 6/2002 | Marshall et al. | |
| 6,416,730 B1 | 7/2002 | Fife | |
| 6,420,066 B1 | 7/2002 | Frustaci et al. | |
| 6,455,108 B1 | 9/2002 | Muffoletto et al. | |
| 6,461,759 B1 | 10/2002 | Miller et al. | |
| 6,461,771 B1 | 10/2002 | Frysz et al. | |
| 6,468,317 B1 | 10/2002 | Strange et al. | |
| 6,468,605 B2 | 10/2002 | Shah et al. | |
| 6,522,524 B1 | 2/2003 | Feger et al. | |
| 6,527,937 B2 | 3/2003 | Fife | |
| 6,562,255 B1 | 5/2003 | Feger | |
| 6,576,099 B2 | 6/2003 | Kimmel et al. | |
| 6,587,329 B1 | 7/2003 | Feger | |
| 6,589,441 B1 | 7/2003 | Feger | |
| 6,592,740 B2 | 7/2003 | Fife | |
| 6,594,139 B2 | 7/2003 | Muffoletto et al. | |
| 6,594,140 B1 | 7/2003 | Evans et al. | |
| 6,599,580 B2 | 7/2003 | Muffoletto et al. | |
| 6,613,474 B2 | 9/2003 | Frustaci et al. | |
| 6,639,787 B2 | 10/2003 | Kimmel et al. | |
| 6,652,729 B2 | 11/2003 | Melody et al. | |
| 6,687,117 B2 | 2/2004 | Liu et al. | |
| 6,707,660 B1 | 3/2004 | Evans et al. | |
| 6,721,169 B2 | 4/2004 | Melody et al. | |
| 6,721,170 B1 | 4/2004 | Evans et al. | |
| 6,727,022 B2 | 4/2004 | Gan et al. | |
| 6,740,420 B2 | 5/2004 | Muffoletto et al. | |
| 6,743,370 B1 | 6/2004 | Feger et al. | |
| 6,743,547 B2 | 6/2004 | Gan et al. | |
| 6,744,619 B1 | 6/2004 | Feger | |
| 6,773,632 B1 | 8/2004 | Marshall et al. | |
| 6,788,523 B1 | 9/2004 | Hossick-Schott et al. | |
| 6,790,561 B2 | 9/2004 | Gan et al. | |
| 6,801,424 B1 | 10/2004 | Nielsen et al. | |
| 6,827,879 B2 | 12/2004 | Shinozaki et al. | |
| 6,828,059 B2 | 12/2004 | Miller et al. | |
| 6,842,328 B2 | 1/2005 | Schott et al. | |
| 6,859,354 B2 | 2/2005 | Viste et al. | |
| 6,888,717 B2 | 5/2005 | Kinard et al. | |
| 6,893,777 B2 | 5/2005 | Probst | |
| 6,939,774 B2 | 9/2005 | Viste et al. | |
| 6,951,576 B1 | 10/2005 | Takeuchi | |
| 6,985,352 B2 | 1/2006 | Norton | |
| 6,987,663 B2 | 1/2006 | Merker et al. | |
| 6,995,971 B2 | 2/2006 | Norton et al. | |
| 7,000,297 B2 | 2/2006 | Frustaci et al. | |
| 7,002,790 B2 | 2/2006 | Hossick-Schott et al. | |
| 7,004,983 B2 * | 2/2006 | Honda et al. | 29/25.03 |
| 7,038,901 B2 | 5/2006 | Muffoletto et al. | |
| 7,072,171 B1 | 7/2006 | Muffoletto et al. | |
| 7,079,377 B2 | 7/2006 | Schott et al. | |
| 7,081,141 B2 | 7/2006 | Hossick-Schott et al. | |
| 7,099,143 B1 * | 8/2006 | Fife et al. | 361/516 |
| 7,116,547 B2 | 10/2006 | Seitz et al. | |
| 7,116,548 B2 | 10/2006 | Satterfield, Jr. et al. | |
| 7,154,740 B2 | 12/2006 | Merker et al. | |
| 7,154,742 B1 * | 12/2006 | Hahn et al. | 361/528 |
| 7,168,142 B2 | 1/2007 | Nowaczyk | |
| 7,169,284 B1 | 1/2007 | Jiang et al. | |
| 7,220,397 B2 | 5/2007 | Kimmel et al. | |
| 7,224,576 B2 | 5/2007 | Hossick-Schott | |
| 7,242,572 B2 | 7/2007 | Norton et al. | |
| 7,244,279 B2 | 7/2007 | Seitz et al. | |
| 7,256,982 B2 | 8/2007 | Lessner et al. | |
| 7,268,995 B2 | 9/2007 | Yoshida et al. | |
| 7,268,996 B1 | 9/2007 | Dap et al. | |
| 7,271,994 B2 | 9/2007 | Stemen et al. | |
| 7,279,015 B2 | 10/2007 | Merker | |
| 7,314,685 B2 | 1/2008 | Brown et al. | |
| 7,324,329 B2 | 1/2008 | Dweik et al. | |
| 7,341,705 B2 | 3/2008 | Schnitter | |
| 7,341,801 B2 | 3/2008 | Reuter et al. | |
| 7,352,558 B2 | 4/2008 | Zhong et al. | |
| 7,377,947 B2 | 5/2008 | Merker et al. | |
| 7,381,396 B2 | 6/2008 | Thomas et al. | |
| 7,402,183 B1 | 7/2008 | Jiang | |
| 7,411,779 B2 | 8/2008 | Merker et al. | |
| 7,419,926 B2 | 9/2008 | Schnitter et al. | |
| 7,471,503 B2 | 12/2008 | Bruner et al. | |
| 7,474,521 B2 | 1/2009 | Hossick-Schott | |
| 7,483,260 B2 | 1/2009 | Ziarniak et al. | |
| 7,485,240 B1 | 2/2009 | Feger et al. | |
| 7,499,260 B2 | 3/2009 | Schott et al. | |
| 7,544,218 B2 | 6/2009 | Norton et al. | |
| 7,585,428 B1 | 9/2009 | Marshall et al. | |
| 7,667,954 B2 | 2/2010 | Lessner et al. | |
| 7,687,102 B2 | 3/2010 | Hossick-Schott et al. | |
| 7,736,802 B1 | 6/2010 | Smyth | |
| 7,785,741 B2 | 8/2010 | Viavattine | |
| 2004/0240152 A1 | 12/2004 | Schott et al. | |
| 2004/0243183 A1 | 12/2004 | Norton et al. | |
| 2005/0089711 A1 | 4/2005 | Hossick-Schott | |
| 2005/0098242 A1 | 5/2005 | Hossick-Schott et al. | |
| 2006/0028786 A1 | 2/2006 | Norton et al. | |
| 2006/0070492 A1 * | 4/2006 | Qiu | 75/255 |
| 2006/0091020 A1 | 5/2006 | Hossick-Schott et al. | |
| 2006/0139850 A1 | 6/2006 | Rorvick et al. | |
| 2007/0025063 A1 | 2/2007 | Viste et al. | |
| 2007/0171595 A1 * | 7/2007 | Komatsu et al. | 361/503 |
| 2007/0201186 A1 | 8/2007 | Norton et al. | |
| 2007/0211413 A1 * | 9/2007 | Fife et al. | 361/516 |
| 2007/0274025 A1 | 11/2007 | Lessner et al. | |
| 2008/0007894 A1 | 1/2008 | Seitz et al. | |
| 2008/0013257 A1 | 1/2008 | Seitz et al. | |
| 2008/0085451 A1 | 4/2008 | Freitag et al. | |
| 2008/0229565 A1 | 9/2008 | Schott et al. | |
| 2008/0304208 A1 | 12/2008 | Murakami et al. | |
| 2009/0035652 A1 | 2/2009 | Freitag et al. | |
| 2009/0081552 A1 | 3/2009 | Shah et al. | |
| 2009/0117457 A1 | 5/2009 | Davis et al. | |
| 2010/0289458 A1 | 11/2010 | Viste et al. | |
| 2010/0326967 A1 | 12/2010 | Freitag et al. | |

FOREIGN PATENT DOCUMENTS

| | | | |
|---|---|---|---|
| GB | 2447724 A | | 9/2008 |
| JP | 04266009 A | * | 9/1992 |

OTHER PUBLICATIONS

*Conducting Polymers in Ultracapacitor Applications*, Aldissi et al., Conference Proceedings at ANTEC '98, Atlanta, GA, Apr. 26-30, 1998, vol. II Materials, 6 pages.

*Effect of Water Content in Ethylene Glycol as Electrolyte for Fabrication of Anodic Titania Nanotubes: Synchrotron XRD Characterization*, Lin et al., 1 page.

*High Energy Density Electrolytic-Electrochemical Hybrid Capacitor*, Evans et al., Mar. 22, 1994, 6 pages.

Related U.S. Patent Application Form.

Search Report for GB1000235.0 dated Apr. 13, 2010, 3 pages.

* cited by examiner

HIGH VOLTAGE ELECTROLYTIC CAPACITORS

BACKGROUND OF THE INVENTION

Electrolytic capacitors typically have a larger capacitance per unit volume than certain other types of capacitors, making them valuable in relatively high-current and low-frequency electrical circuits. One type of capacitor that has been developed is a "wet" electrolytic capacitor that includes a sintered tantalum powder anode. These tantalum "slugs" have very large internal surface area. These tantalum slugs first undergo an electrochemical oxidation that forms an oxide layer coating acting as dielectric over the entire external and internal surfaces of the tantalum body. The anodized tantalum slugs are then sealed in cans containing a highly conductive and corrosive liquid electrolyte solution, having high surface area with conductive linings allowing the flow of the current to the liquid electrolyte solution.

The electrolyte solutions used in wet tantalum electrolytic capacitors have traditionally consisted of one of two basic formulations. The first formulation consists of an aqueous solution of lithium chloride. The second electrolyte formulation traditionally used in wet tantalum capacitors consists of an aqueous solution of 35-40% sulfuric acid. Despite being corrosive, such a sulfuric acid electrolyte possesses a low resistivity, wide temperature capability, and relatively high maximum operating voltage, which have made it the choice for the vast majority of conventional wet tantalum capacitors. Nevertheless, efforts have been made to develop other electrolytes for wet capacitors. U.S. Pat. No. 6,219,222 to Shah, et al., for instance, describes an electrolyte that employs a solvent system that includes water and ethylene glycol, as well as an ammonium salt. Shah, et al. indicates that the electrolyte has a high conductivity and breakdown voltage, which lowers the equivalent series resistance. Unfortunately, problems remain in that such capacitors still have difficulty reaching high voltage values.

As such, a need currently exists for an improved wet electrolytic capacitor that is capable of achieving a high voltage.

SUMMARY OF THE INVENTION

In accordance with one embodiment of the present invention, an electrolytic capacitor is disclosed that comprises a porous anode body that contains a dielectric layer formed by anodic oxidation; a cathode comprising a metal substrate coated with a conductive polymer; and an aqueous electrolyte disposed in contact with the cathode and the anode. The electrolyte comprises a salt of a weak organic acid and an aqueous solvent. The electrolyte has a pH of from about 4.5 to about 7.0 and an ionic conductivity of from about 0.1 to about 30 milliSiemens per centimeter, determined at a temperature of 25° C.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGURE in which.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrolytic capacitor that includes a porous anode body containing a dielectric layer, a cathode containing a metal substrate coated with a conductive polymer, and an aqueous electrolyte. The ionic conductivity of the electrolyte is selectively controlled within a particular range so that the capacitor can be charged to a high voltage. More specifically, the electrolyte typically has an ionic conductivity of from about 0.1 to about 30 milliSiemens per centimeter ("mS/cm"), in some embodiments from about 0.5 to about 25 mS/cm, in some embodiments from about 1 mS/cm to about 20 mS/cm, and in some embodiments, from about 2 to about 15 mS/cm, determined at a temperature of 25° C. using any known electric conductivity meter (e.g., Oakton Con Series 11). Within the ranges noted above, it is believed that the ionic conductivity of the electrolyte allows the electric field to extend into the liquid electrolyte to a length (Debye length) sufficient to result in significant charge separation. This extends the potential energy of the dielectric to the electrolyte so that the resulting capacitor is able to store even more potential energy than predicted by the thickness of the dielectric oxide layer. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The ionic conductivity of the electrolyte is achieved in part by selecting a specific type of salt within a certain concentration range. Namely, the present inventors have discovered that salts of weak organic acids are particularly effective for use in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

The concentration of the weak organic acid salts in the electrolyte is selected to achieve the desired ionic conductivity. While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The aqueous electrolyte may generally possess any of a variety of forms, such as a solution, dispersion, gel, etc. Regardless of its form, however, the aqueous electrolyte contains water (e.g., deionized water) as a solvent. For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. In certain cases, a secondary solvent may also be employed in conjunction with water to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

The aqueous electrolyte is also relatively neutral and has a pH of from about 4.5 to about 7.0, in some embodiments from about 5.0 to about 6.5, and in some embodiments, from about 5.5 to about 6.0. If desired, one or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

The anode of the electrolytic capacitor includes a porous body that may be formed from a valve metal composition having a high specific charge, such as about 5,000 μF*V/g or more, in some embodiments about 25,000 μF*V/g or more, in some embodiments about 50,000 μF*V/g or more, and in some embodiments, from about 70,000 to about 300,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the porous anode body. In one embodiment, a tantalum or niobium oxide powder having a certain particle size is first selected. The particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

The anode body may be anodically oxidized ("anodized") so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described above. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The cathode of the wet electrolytic capacitor contains a metal substrate that may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium metals, as well as alloys thereof, are particularly suitable for use in the present invention. The geometric configuration of the substrate may generally vary as is well known to those skilled in the art, such as in the form of a container, can, foil, sheet, screen, mesh, etc. The surface area of the substrate may range from about 0.05 to about 5 square centimeters, in some embodiments from about 0.1 to about 3 square centimeters, and in some embodiments, from about 0.5 to about 2 square centimeters.

A conductive polymer coating is also present on the metal substrate. Without intending to be limited by theory, the present inventors believe that charging of the capacitor to a high voltage (e.g., greater than the formation voltage) forces ions of the electrolyte into the polymer layer, which is promoted by the low wetting angle of aqueous electrolytes in conductive polymer systems. The movement of the ions causes the polymer to "swell" and retain the ions near the electrode surface, thereby enhancing charge density. Nevertheless, because the conductive polymer is generally amorphous and non-crystalline, it can also dissipate and/or absorb the heat associated with the high voltage. Upon discharge, it is also believed that the conductive polymer "relaxes" and allows ions in the electrolyte to move out of the polymer layer. Through such swelling and relaxation mechanism, charge density near the electrode can be increased without a chemical reaction with the electrolyte.

Generally speaking, conductive polymers are π-conjugated polymers that have electrical conductivity after oxidation or reduction. Examples of such conductive polymers may include, for instance, polypyrroles; polythiophenes; polyanilines; polyacetylenes; poly-p-phenylenes (e.g., poly (p-phenylene sulfide) or poly(p-phenylene vinylene)); polyfluorenes, polytetrathiafulvalenes, polynaphthalenes, derivatives of the foregoing polymers, blends thereof, and so forth. One particularly suitable class of conductive polymers are poly(alkylenethiophenes), such as poly(3,4-ethylenedioxythiophene ("PEDT"). Various suitable conductive polymers are also described in U.S. Pat. No. 7,471,503 to Bruner, et al.; U.S. Pat. No. 7,411,779 to Merker, et al.; U.S. Pat. No. 7,377,947 to Merker, et al.; U.S. Pat. No. 7,341,801 to Reuter, et al.; U.S. Pat. No. 7,279,015 to Merker; U.S. Pat. No. 7,154,740 to Merker, et al.; U.S. Pat. No. 6,987,663 to Merker, et al.; and U.S. Pat. No. 4,910,645 to Jonas, et al., which are incorporated herein in their entirety by reference thereto for all purposes.

Other materials may be employed in the conductive polymer coating for a variety of purposes. For instance, conductive fillers such as activated carbon, carbon black, graphite, etc. may be employed to enhance conductivity. Some suitable forms of activated carbon and techniques for formation thereof are described in U.S. Pat. No. 5,726,118 to Ivey, et al.; U.S. Pat. No. 5,858,911 to Wellen, et al.; as well as U.S. Patent Application Publication No. 2003/0158342 to Shinozaki, et al., all of which are incorporated herein in their entirety by reference thereto for all purposes. Polymeric anions may sometimes be employed to counter any charge associated with the conductive polymer. The anions may, for instance, be polymeric carboxylic acids, such as polyacrylic acids, polymethacrylic acid or polymaleic acids or polymeric sulphonic acids, such as polystyrene sulphonic acids ("PSS") and polyvinyl sulphonic acids. When employed, such polymeric anions and conductive polymers may be present in a ratio by weight of from about 0.5:1 to about 50:1, in some embodiments from about 1:1 to about 30:1, and in some embodiments, from about 2:1 to about 20:1, respectively.

The conductive polymer may be applied to the metal substrate in the form of one or multiple layers and may be formed using a variety of known techniques. For instance, techniques such as screen-printing, dipping, electrophoretic coating, and spraying, may be used to form the coating. In one embodiment, for example, the monomer(s) used to form the conductive polymer (e.g., PEDT), may initially be mixed with a polymerization catalyst to form a dispersion. One suitable polymerization catalyst is CLEVIOS C (Bayer Corporation), which is iron (III) toluene-sulphonate and n-butanol. CLEVIOS C is a commercially available catalyst for CLEVIOS M, which is 3,4-ethylenedioxythiophene, a PEDT monomer also sold by Bayer Corporation. Once a dispersion is formed, the substrate may then be dipped into the dispersion so that the conductive polymer forms. Alternatively, the catalyst and monomer(s) may also be applied separately. For example, the catalyst may be dissolved in a solvent (e.g., butanol) and then applied as a dipping solution. Although various methods have been described above, it should be understood that any other method for applying the coating comprising the conductive polymer coating may also be utilized. For example, other methods for applying such a coating comprising one or more conductive polymers may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

Figure 1:
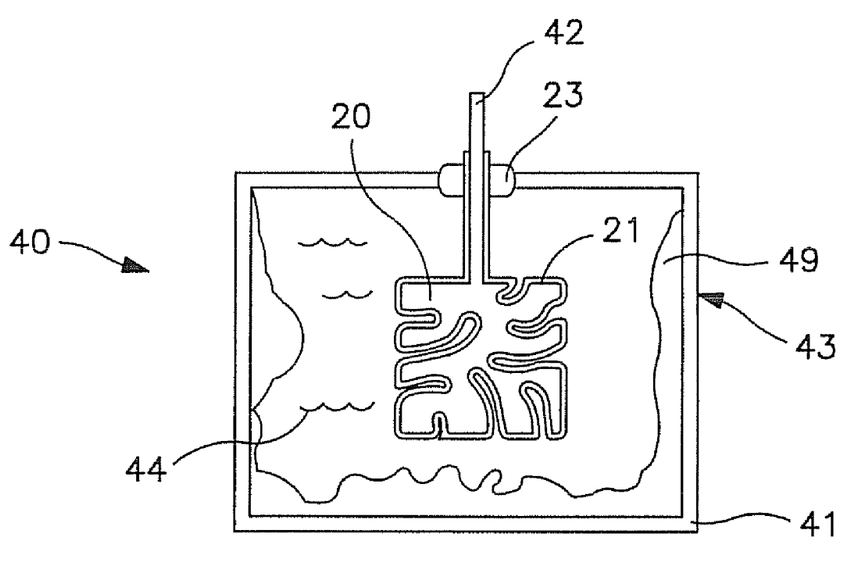
FIG. 1 is a cross-sectional view of one embodiment of a capacitor formed according to the present invention.

The physical arrangement of the anode, cathode, and electrolyte of the capacitor may generally vary as is well known in the art. Referring to FIG. 1, for example, one embodiment of an electrolytic capacitor 40 is shown that includes an aqueous electrolyte 44 disposed between an anode 20 and a cathode 43. The anode 20 contains a dielectric layer 21 and is embedded with a lead 42 (e.g., tantalum wire). The cathode 43 is formed from a substrate 41, such as described above, and a conductive polymer coating 49. In this embodiment, the cathode substrate 41 is in the form of a cylindrically-shaped "can" with an attached lid. A seal 23 (e.g., glass-to-metal) may also be employed that connects and seals the anode 20 to the cathode 43. If desired, a separator (e.g., paper, plastic fibers, glass fibers, porous membranes, and ion-permeable materials, such as Nafion™) may also be positioned between the cathode 43 and anode 20 to prevent direct contact between the anode and cathode, yet permit ionic current flow of the electrolyte 44 to the electrodes.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 900 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following examples.

EXAMPLE 1

An electrolyte was formed by dissolving 10.65 grams of ammonium adipate ($NH_4OC(O)(CH_2)_4C(O)ONH_4$) in 55 milliliters of deionized water. Thereafter, 26 milliliters of ethylene glycol and 0.5 grams of $H_3PO4$ (85%) were added to the solution.

EXAMPLE 2

An electrolyte was formed as described in Example 1, except that 5.3 grams of ammonium adipate was employed.

EXAMPLE 3

An electrolyte was formed as described in Example 1, except that 2.65 grams of ammonium adipate was employed.

EXAMPLE 4

An electrolyte was formed by dissolving 10.65 grams of ammonium adipate in 55 milliliters of deionized water. Thereafter, 26 milliliters of ethylene glycol, 0.1 grams of 3-methyl-4-nitrobenzoic acid ("MNBA"), and 0.5 grams of $H_3PO4$ (85%) were added to the solution.

EXAMPLE 5

An electrolyte was formed as described in Example 4, except that 5.3 grams of ammonium adipate was employed.

EXAMPLE 6

An electrolyte was formed as described in Example 4, except that 2.65 grams of ammonium adipate was employed.

EXAMPLE 7

An electrolyte was formed by dissolving 10.65 grams of ammonium acetate ($NH_4OC(O)CH_3$) in 55 milliliters of deionized water. Thereafter, 26 milliliters of ethylene glycol and 0.5 grams of $H_3PO4$ (85%) were added to the solution.

EXAMPLE 8

An electrolyte was formed as described in Example 7, except that 5.3 grams of ammonium acetate was employed.

EXAMPLE 9

An electrolyte was formed as described in Example 7, except that 2.65 grams of ammonium acetate was employed.

EXAMPLE 10

An electrolyte was formed by dissolving 10.65 grams of sodium acetate ($NaOC(O)CH_3$) in 55 milliliters of deionized water. Thereafter, 26 milliliters of ethylene glycol and 0.5 grams of $H_3PO4$ (85%) were added to the solution.

EXAMPLE 11

An electrolyte was formed as described in EXAMPLE 10, except that 5.3 grams of sodium acetate was employed.

EXAMPLE 12

An electrolyte was formed as described in Example 10, except that 2.65 grams of sodium acetate was employed.

EXAMPLE 13

An electrolyte was formed by dissolving 5.3 grams of lithium acetate ($LiOC(O)CH_3$) in 55 milliliters of deionized water. Thereafter, 26 milliliters of ethylene glycol and 0.5 grams of $H_3PO4$ (85%) were added to the solution.

EXAMPLE 14

An electrolyte was formed as described in Example 13, except that 2.65 grams of lithium acetate was employed.

EXAMPLE 15

An electrolyte was formed by dissolving 2.65 grams of lithium lactate ($LiOC(O)CH(OH)CH_3$) in 55 milliliters of deionized water. Thereafter, 26 milliliters of ethylene glycol and 0.5 grams of $H_3PO4$ (85%) were added to the solution.

EXAMPLE 16

An electrolyte was formed by dissolving 2 grams of ammonium oxalate ($NH_4OC(O)C(O)ONH_4$) in 54 milliliters of deionized water. Thereafter, 26 milliliters of ethylene glycol and 0.5 grams of $H_3PO4$ (85%) were added to the solution.

EXAMPLE 17

An electrolyte was formed as described in Example 16, except that 1 gram of ammonium oxalate was employed.

EXAMPLE 18

An electrolyte was formed as described in Example 16, except that 0.5 grams of ammonium oxalate was employed.

EXAMPLE 19

An electrolyte was formed by dissolving 2 grams of ammonium tartrate ($NH_4OC(O)CH(OH)CH(OH)C(O)ONH_4$) in 54 milliliters of deionized water. Thereafter, 26 milliliters of ethylene glycol and 0.5 grams of $H_3PO4$ (85%) were added to the solution.

EXAMPLE 20

An electrolyte was formed as described in Example 19, except that 1 gram of ammonium tartrate was employed.

EXAMPLE 21

An electrolyte was formed as described in Example 19, except that 0.5 grams of ammonium tartrate was employed.

EXAMPLE 22

An electrolyte was formed by dissolving 2.7 grams of disodium tartrate ($NaOC(O)CH(OH)CH(OH)C(O)ONa$) in 54 milliliters of deionized water. Thereafter, 26 milliliters of ethylene glycol and 0.5 grams of $H_3PO4$ (85%) were added to the solution.

Testing of Examples

Various properties of the electrolytes of Examples 1-14 and 16-22 were tested. More specifically, a metal substrate was formed by degreasing a titanium can and etching it with oxalic acid (10 wt. % aqueous solution), drying the plate, and roughening its interior surface with sandpaper and a Dremel tool. The roughened surface was subsequently coated with PEDT polymer. The coating was applied by dipping the titanium metal into a solution of CLEVIOS C dissolved in 1-butanol. After the CLEVIOS C was applied, the metal was dipped into CLEVIOS M and placed into a humidity and temperature controlled box for 30 minutes. The relative humidity of the chamber ranged from 75-85% and the temperature ranged from 22° C. to 25° C. Thereafter, the coated metal was washed with methanol or ethanol 4 times to remove any unpolymerized material and residues from the Baytron C. The final drying step was also performed in a controlled humidity chamber at a relative humidity of about 60%. The coating, washing and drying steps were repeated for 4 times to achieve a coating thickness of about 20 to 50 μm on the titanium metal.

The resulting cathode was then immersed into the electrolyte. To test the electrolyte, a porous tantalum cylindrical body was used as the anode that contained a tantalum pentoxide dielectric formed at 205 V. A polypropylene separator material was wetted with the electrolyte. The anode body was completely immersed into the electrolyte, and then pulled out to attach the wetted separator material. With the separator around the anode, the assembly was placed into the electrolyte before being placed into a vacuum oven for 15 minutes. Separately, the titanium cathode was filled with 1 milliliter of the electrolyte. Thereafter, the anode/separator was placed into the titanium can. The assembly was connected with a power supply ((+) pole to the cylindrical anode and the (−) pole to the titanium can) and charged through a 1 kΩ resistor with a current that ranged from 10 to 40 milliAmps. The charging current affected the charging time, which ranged from 4.3 seconds at 10 mA to 1.3 seconds at 40 mA. The assembly was charged to the voltage set by the power supply. After the cell was charged to the set voltage, it was held with the charging current for several minutes. The cell was then discharged through a 100Ω resistor.

The pH, voltage, charge time, and discharge time were measured. The results are shown below in Tables 1-5.

TABLE 1

Properties of Examples 1-6

| Ex. | Salt | % | Ionic Conduct. (mS/cm, 25° C.) | pH | Voltage (V) | Discharge Cap (μF) | Energy (J) | Charge time (s) | Discharge time (ms) |
|---|---|---|---|---|---|---|---|---|---|
| 1 | Ammonium adipate | 11.7 | 39.9 | 6.48 | 240 | 200 | 5.8 | 3.5 | 210 |
| 2 | Ammonium adipate | 5.8 | 26.6 | 6.07 | 270 | 190 | 6.9 | 4.2 | 280 |
| 3 | Ammonium adipate | 2.9 | 14.2 | 5.63 | 280 | 158 | 6.2 | 4.3 | 290 |
| 4 | Ammonium adipate | 11.7 | 40.3 | 6.33 | — | — | — | — | — |
| 5 | Ammonium adipate | 5.8 | 26.5 | 5.93 | 270 | 200 | 7.3 | 4.0 | 180 |
| 6 | Ammonium adipate | 2.9 | 13.9 | 5.57 | 280 | 195 | 7.6 | 4.2 | 210 |

Testing of the ammonium adipate electrolytes resulted in cells that could be charged to 280V. In comparison, it was determined that similar cells employing a 5M $H_2SO_4$ electrolyte could only be charged to 140V. As indicated, lowering the amount of ammonium adipate in the base formulation electrolytes resulted in an increase in stored potential energy. Further, the ionic conductivity of the ammonium adipate electrolytes ranged from about 13.9 to 40.3 mS/cm, which was significantly less than the ionic conductivity of the 5M $H_2SO_4$ electrolyte (~1000 mS/cm).

TABLE 2

Properties of Examples 7-9

| Ex. | Salt | % | Ionic Conduct. (mS/cm, 25° C.) | pH | Voltage (V) | Discharge Cap (μF) | Energy (J) | Charge time (s) | Discharge time (ms) |
|---|---|---|---|---|---|---|---|---|---|
| 7 | Ammonium acetate | 11.7 | 39.0 | 6.07 | 230 | 190 | 5.0 | 1.0 | 152 |
| 8 | Ammonium acetate | 5.8 | 26.0 | 5.86 | 250 | 180 | 5.6 | 1.0 | 184 |
| 9 | Ammonium acetate | 2.9 | 14.9 | 5.48 | 280 | 180 | 7.1 | 1.3 | 204 |

The ammonium acetate electrolytes exhibited similar behavior to the ammonium adipate electrolytes of Examples 1-6.

TABLE 3

Properties of Examples 10-14

| Ex. | Salt | % | Ionic Conduct. (mS/cm, 25° C.) | pH | Voltage (V) | Discharge Cap (µF) | Energy (J) | Charge time (s) | Discharge time (ms) |
|---|---|---|---|---|---|---|---|---|---|
| 10 | Sodium acetate | 11.7 | 26.0 | 6.14 | 150 | 180 | 2.0 | 0.9 | 128 |
| 11 | Sodium acetate | 5.8 | 18.2 | 6.04 | 210 | 190 | 4.2 | 0.9 | 152 |
| 12 | Sodium acetate | 2.9 | 8.6 | 4.94 | 250 | 190 | 5.9 | 1.1 | 184 |
| 13 | Lithium acetate | 5.8 | 10.3 | 5.24 | 230 | 195 | 5.2 | 1.0 | 162 |
| 14 | Lithium acetate | 2.9 | 5.8 | 5.12 | 280 | 210 | 8.2 | 1.4 | 230 |

The sodium and lithium acetate electrolytes also exhibited similar behavior to the ammonium adipate electrolytes of Examples 1-6.

TABLE 4

Properties of Examples 16-21

| Ex. | Salt | % | Ionic Conduct. (mS/cm, 25° C.) | pH | Voltage (V) | Discharge Cap (µF) | Energy (J) | Charge time (s) | Discharge time (ms) |
|---|---|---|---|---|---|---|---|---|---|
| 16 | Ammonium oxalate | 2.4 | 6.8 | 4.5 | 290 | 200 | 8.4 | — | — |
| 17 | Ammonium oxalate | 1.2 | 4.3 | 4.5 | 290 | 200 | 8.4 | — | — |
| 18 | Ammonium oxalate | 0.6 | 2.3 | 4.0 | 290 | 200 | 8.4 | — | — |
| 19 | Ammonium tartrate | 2.4 | 9.1 | 4.7 | 280 | 200 | 7.8 | — | — |
| 20 | Ammonium tartrate | 1.2 | 5.1 | 4.4 | 290 | 200 | 8.4 | — | — |
| 21 | Ammonium tartrate | 0.6 | 2.7 | 3.8 | 270 | 200 | 7.3 | — | — |

As indicated, the ammonium oxalate and tartrate electrolytes were easily charged to voltages as high as 290V. It is believed that such high voltages were achieved because the solubility limit of the ammonium salts of oxalic acid and tartaric acid is low, and thus, the maximum concentration in the electrolyte is limited.

TABLE 5

Properties of Example 22

| Ex. | Salt | % | Ionic Conduct. (mS/cm, 25° C.) | pH | Voltage (V) | Discharge Cap (µF) | Energy (J) | Charge time (s) | Discharge time (ms) |
|---|---|---|---|---|---|---|---|---|---|
| 22 | Sodium tartrate | 2.9 | 6.8 | 4.6 | 280 | 200 | 7.8 | | |

The sodium tartrate electrolyte exhibited similar behavior to the ammonium tartrate electrolytes of Examples 19-21.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   a porous anode body that is formed from tantalum or niobium oxide, wherein the anode body further contains a dielectric layer formed by anodic oxidation;
   a cathode comprising a metal substrate coated with a conductive polymer, wherein a surface of the metal substrate is in direct contact with the conductive polymer coating; and
   an aqueous electrolyte disposed in contact with the cathode and the anode, wherein the electrolyte comprises a salt of a weak organic acid and water, wherein the electrolyte has a pH of from about 4.5 to about 7.0, determined at a temperature of 25° C., wherein the organic acid has a first acid dissociation constant of from 2 to 10, determined at a temperature of 25° C., and further wherein the weak organic acid is a polyprotic acid.

2. The wet electrolytic capacitor of claim 1, wherein the electrolyte has an ionic conductivity of from about 0.1 to about 30 milliSiemens per centimeter, determined at a temperature of 25° C.

3. The wet electrolytic capacitor of claim 1, wherein the pH is from about 5.0 to about 6.5.

4. The wet electrolytic capacitor of claim 1, wherein the salt contains a monatomic cation.

5. The wet electrolytic capacitor of claim 4, wherein the monatomic cation is an alkali metal ion.

6. The wet electrolytic capacitor of claim 1, wherein the salt contains a polyatomic cation.

7. The wet electrolytic capacitor of claim 6, wherein the polyatomic cation is an ammonium ion.

8. The wet electrolytic capacitor of claim 1, wherein the polyprotic carboxylic acid is adipic acid, α-tartaric acid, meso-tartaric acid, oxalic acid, citric acid, or a combination thereof.

9. The wet electrolytic capacitor of claim 1, wherein salts of a weak organic acid constitute from about 0.1 to about 25 wt. % of the electrolyte.

10. The wet electrolytic capacitor of claim 1, wherein salts of a weak organic acid constitute from about 0.3 to about 15 wt. % of the electrolyte.

11. The wet electrolytic capacitor of claim 1, wherein water constitutes from about 20 to about 95 wt. % of the electrolyte.

12. The wet electrolytic capacitor of claim 1, wherein the electrolyte further comprises a secondary solvent.

13. The wet electrolytic capacitor of claim 1, wherein the secondary solvent includes ethylene glycol.

14. The wet electrolytic capacitor of claim 1, wherein the metal substrate comprises titanium.

15. The wet electrolytic capacitor of claim 1, wherein the conductive polymer is a polythiophene.

16. The wet electrolytic capacitor of claim 15, wherein the polythiophene is poly(3,4-ethylenedioxythiophene) or a derivative thereof.

17. The wet electrolytic capacitor of claim 1, wherein the ratio of the voltage to which the capacitor is capable of being charged to the voltage at which the dielectric layer is formed is from about 1.0 to 2.0.

18. The wet electrolytic capacitor of claim 1, wherein the voltage to which the capacitor is capable of being charged is from about 200 to about 350 V.

19. The wet electrolytic capacitor of claim 1, wherein the voltage to which the capacitor is capable of being charged is from about 250 to about 300 V.

20. The wet electrolytic capacitor of claim 1, wherein the coating consists essentially of a conductive polymer.

21. The wet electrolytic capacitor of claim 1, wherein the porous anode body has a curved shape.

22. The wet electrolytic capacitor of claim 1, wherein the porous anode body has a fluted shape.

23. The wet electrolytic capacitor of claim 1, wherein the tantalum or niobium oxide is in the form of flaked particles.

24. The wet electrolytic capacitor of claim 1, wherein the metal substrate has a cylindrical shape.

25. The wet electrolytic capacitor of claim 1, wherein the electrolyte comprises a gel.

26. The wet electrolytic capacitor of claim 1, wherein the electrolyte comprises ethylene glycol, phosphoric acid, and a salt of adipic acid.

* * * * *